United States Patent
Garg et al.

(10) Patent No.: US 8,722,952 B2
(45) Date of Patent: May 13, 2014

(54) PROCESS FOR PRODUCTION OF BENZENE LEAN GASOLINE BY RECOVERY OF HIGH PURITY BENZENE FROM UNPROCESSED CRACKED GASOLINE FRACTION CONTAINING ORGANIC PEROXIDES

(71) Applicants: Council of Scientific & Industrial Research, New Delhi (IN); Reliance Industries Limited, Mumbai (IN)

(72) Inventors: Madhukar Onkarnath Garg, Dehradun (IN); Shrikant Madhusudan Nanoti, Dehradun (IN); Ram Bhagat Nautiyal, Dehradun (IN); Kumar Sunil, Dehradun (IN); Prasenjit Ghosh, Dehradun (IN); Nisha, Dehradun (IN); Pooja Yadav, Dehradun (IN); Kumar Jagdish, Dehradun (IN); Manish Tiwari, Ghansoli (IN); Meka Raja Rao, Ghansoli (IN); Nagarathinam Shengaga Murthy, Ghansoli (IN)

(73) Assignees: Council of Scientific & Industrial Research, New Delhi (IN); Reliance Industries Limited, Mumbai (IN)

( * ) Notice: Subject to any disclaimer, the term of this patent is extended or adjusted under 35 U.S.C. 154(b) by 0 days.

(21) Appl. No.: 13/963,772

(22) Filed: Aug. 9, 2013

(65) Prior Publication Data
US 2014/0042059 A1 Feb. 13, 2014

(51) Int. Cl.
*C07C 7/08* (2006.01)

(52) U.S. Cl.
USPC ............ 585/508; 208/313; 585/507; 585/504

(58) Field of Classification Search
USPC .......................... 208/313; 585/804, 807–808
See application file for complete search history.

(56) References Cited

U.S. PATENT DOCUMENTS

| | | | |
|---|---|---|---|
| 3,591,490 A | 7/1971 | Muller et al. | |
| 3,723,256 A | 3/1973 | Thompson | |
| 4,594,144 A | 6/1986 | James, Jr. et al. | |
| 5,022,981 A | 6/1991 | Forte | |
| 5,399,244 A | 3/1995 | Gentry et al. | |
| 5,401,385 A | 3/1995 | Schmidt et al. | |
| 5,817,227 A | 10/1998 | Mikitenko et al. | |
| 6,551,502 B1* | 4/2003 | Lee et al. | 208/211 |
| 6,620,311 B2 | 9/2003 | Morcel et al. | |
| 6,855,853 B2 | 2/2005 | Groten et al. | |
| 7,005,058 B1* | 2/2006 | Towler | 208/211 |
| 7,175,754 B2 | 2/2007 | Groten et al. | |

(Continued)

FOREIGN PATENT DOCUMENTS

| | | |
|---|---|---|
| GB | 1155416 A | 6/1969 |
| GB | 1505722 A | 3/1978 |

OTHER PUBLICATIONS

Umansky, B. et al., "Banish the benzene, boost the octane." Hydrocarbon Engineering, Jun. 2007, pp. 61-62.

*Primary Examiner* — Prem C Singh
*Assistant Examiner* — Michelle Stein
(74) *Attorney, Agent, or Firm* — McDonnell Boehnen Hulbert & Berghoff LLP

(57) ABSTRACT

Disclosed is a process for production of benzene lean gasoline by recovery of high purity benzene from a narrow boiling benzene concentrated unprocessed cracked gasoline fraction. The process involves subjecting the feed material to an extractive distillation (ED) operation using an aromatic selective solvent in combination with a co-solvent.

12 Claims, 3 Drawing Sheets

(56) References Cited

U.S. PATENT DOCUMENTS

| | | |
|---|---|---|
| 7,501,549 B2 | 3/2009 | Podrebarac et al. |
| 7,525,002 B2 | 4/2009 | Umansky et al. |
| 7,871,514 B2 | 1/2011 | Lee et al. |
| 8,142,646 B2 | 3/2012 | Choi et al. |
| 8,143,466 B2 | 3/2012 | Loescher et al. |
| 8,366,913 B2 | 2/2013 | Choi et al. |
| 8,395,006 B2 | 3/2013 | Clark et al. |
| 8,419,930 B2 | 4/2013 | Ding |

\* cited by examiner

PROCESS FOR PRODUCTION OF BENZENE LEAN GASOLINE BY RECOVERY OF HIGH PURITY BENZENE FROM UNPROCESSED CRACKED GASOLINE FRACTION CONTAINING ORGANIC PEROXIDES

This application claims priority from Indian Application No. 2502/DEL/2012, filed Aug. 9, 2012, the disclosure of which is herein incorporated by reference in its entirety.

FIELD OF THE INVENTION

The present invention relates to a process for production of benzene lean gasoline by recovery of high purity benzene from unprocessed cracked gasoline fraction containing organic peroxides.

More particularly, the present invention relates to a process for production of benzene lean gasoline (benzene content less than 0.4 weight %) by recovery of high purity benzene (purity more than 97 weight %) from unprocessed cracked gasoline fraction (boiling in the range of 40-90° C.) comprising benzene in the range of 10-30 weight % and close-boiling non-aromatic hydrocarbons like paraffins, iso-paraffins, olefins, di-olefins (including conjugated di-olefins), and naphthenes in the range of 70-90 weight % along with impurities containing but not limited to oxygenates, metals, chlorides, sulphur compounds, nitrogen compounds and organic peroxides in an extractive distillation (ED) operation using an aromatic selective solvent system like aqueous N-Methyl-2-Pyrrolidone (NMP), aqueous Di-methyl-formamide (DMF) or aqueous N-Formyl-Morpholine (NFM).

BACKGROUND OF THE INVENTION

Benzene being a toxic component, its concentration in gasoline blends is a major health concern and hence placed under environmental regulations worldwide. Current regulations restrict the annual average benzene level in Gasoline sold in U.S to 0.62% vol. The major contributors of benzene in the gasoline pool in the hydrocarbon industry, typically, are reformate, hydrogenated pyrolysis gasoline (PG) and catalytically cracked gasoline.

Removal or recovery of benzene from reformate and hydrogenated PG is straightforward and is carried out by solvent extraction and/or extractive distillation using polar solvents such as NMP, Sulfolane, NFM, etc., and several commercial units are currently in operation worldwide. A number of patents are available describing these processes. For example, U.S. Pat. No. 3,591,490 shows a process for separating aromatic hydrocarbons from reformate and hydrogenated pyrolysis gasoline using N-Methyl-2-Pyrrolidone (NMP) or Di-methylformamide (DMF) as a solvent. Similarly, U.S. Pat. Nos. 3,723,256 and 5,022,981 disclose methods of recovering aromatics from hydrogenated pyrolysis gasoline with sulfolane or other related solvents using extractive distillation. However, these patents deal with hydrocarbon mixtures like reformate and hydrogenated pyrolysis gasoline and do not cover treatment of cracked feedstocks.

Unlike reformate and hydrogenated PG, unprocessed cracked gasoline fraction contains olefins along with impurities like oxygenates, metals, chlorides, sulphur compounds, nitrogen compounds, and organic peroxides. Due to the complex nature of this feedstock, an economic and reliable benzene recovery process is difficult to develop and has not been practiced in the industry so far.

Both olefins and aromatics in cracked gasoline contribute substantially to the octane number in the gasoline pool. An attempt to reduce benzene by well-known hydro-processing routes would result in saturating the olefins as well, thus lowering the octane of the cracked gasoline fraction. Several other alternative methods have also been developed to reduce benzene in cracked gasoline. Some of these are described below.

One such process removes benzene from FCC naphtha stream containing paraffins, C6 olefins and C6 iso-olefins. This process includes a number of steps such as:
  Separation of benzene concentrate stream;
  Subjecting this stream to etherification with an alcohol over an etherification catalyst to convert the C6 iso-olefins to ethers;
  Separating the ethers of C6 iso-olefins from benzene concentrate;
  Dissociation of ethers of C6 iso-olefins to recover alcohol and C6 iso-olefins; and
  Hydro treatment of ether removed benzene concentrate to remove olefins and organic impurities.

Removal of benzene from hydro treated benzene concentrate fraction using solvent extraction. The main emphasis is given on the etherification of iso-olefins and their separation from benzene. The process incorporates a number of steps for benzene removal and no commercial units came out based on the process mentioned. Further, the removal of benzene by solvent extraction from hydro-treated benzene concentrate underlines the difficulty in the recovery of benzene from olefinic feedstock containing substantial impurities.

Another patent, U.S. Pat. No. 8,143,466, discloses a process for removal of benzene from gasoline and involves partial alkylation of benzene in presence of catalyst with alcohol and ether. Alkylated benzene is recovered as bottom stream and the top hydrocarbon stream is water washed to recover the un-reacted alcohol and ether.

Other processes for removal of benzene from benzene rich hydrocarbon fraction have been developed and commercialized that involve alkylation of benzene with light olefins rich feed stock over a solid acid catalyst. But this process is applied to reformate and cannot be used for treating unprocessed cracked gasoline because of the susceptibility of the catalyst to the impurities present in cracked gasoline The above processes either convert benzene or involve several steps to remove benzene from cracked gasoline fraction.

As mentioned above, there is no commercial unit operating for benzene recovery from unprocessed cracked gasoline fraction (boiling in the range 40 to 90° C.) containing olefins, di-olefins, paraffins, iso-paraffins, naphthenes, benzene, along with impurities like oxygenates, metals, chlorides, sulphur compounds, nitrogen compounds, and organic peroxides. One of the reasons may be the potential of polymerization of olefins, particularly di-olefins (specially conjugated types) in the presence of reactive organic peroxides.

Instances of such polymerization, especially when conjugated olefins are present, have been reported many a time as evident below.

A number of investigators have found that di-olefins containing conjugated double bonds oxidize and produce organic peroxides much more readily than olefins of other types. It has been shown that fulvenes absorb oxygen and resinify with extraordinary rapidity. Conjugated di-olefins oxidize much more readily than simple olefins, and it has been reported that accelerated oxidation tests do not affect simple olefins, but only di-olefins, and that di-olefins as a class are markedly less stable than mono olefins, but the position of the double bonds is important in determining stability. Conjugated double bonds introduce extreme instability, while compounds containing double bonds widely separated is almost as stable as an average olefin. Similar conclusions have been drawn regarding hexadienes. Those with separated double bonds did not absorb a measurable amount of oxygen during several months' exposure at room temperature. The isomeric conjugated compounds have been shown to absorb oxygen immediately on exposure, and that oxidation continues at a rapid rate.

The tendency of cracked gasoline to react with oxygen and form peroxides has been found to be attributable in part to conjugated di-olefins and in part to other olefinic material. Di-olefins and olefins present together form more peroxidic compounds and more gum than when present individually in the same concentration.

It has also been reported that peroxides develop in stored gasoline. The actual structures of the peroxidic substances formed by auto oxidation have not been ascertained nor their formation chemistry. Oxygenates like aldehydes have been reported in oxidized cracked gasoline and it is postulated that some of the resulting peroxides may originate from them as well. It is also theorised that per-acids formed from aldehydes are also essential catalysts in polymerization.

Alkenes are known to undergo polymerization at high reaction temperature in polar medium under acidic conditions. Alkenes with more than 2 carbons have reactive allylic carbon atoms which in turn have allylic hydrogen atoms. Allylic carbon-hydrogen bond dissociation energy is relatively less than other C—H bond energies due to which allylic hydrogen can be substituted relatively easily. The resonance stabilisation of the formed allylic radical/cation/anion is the main factor responsible for substitution of allylic hydrogen. In a free radical substitution reaction the allylic radical formed can be stabilized by resonance. Thus conjugated di-olefins are more susceptible to oxidation. In presence of free radicals at high temperature or even in presence of di-radical oxygen, these allylic carbon-hydrogen bonds generate allylic radicals which are subsequently stabilized by resonance. The allylic radicals attack other olefin molecules and initiate chain growth polymerization. These free radicals may also react with di-radical oxygen to give peroxy radicals through auto-oxidation reactions. These peroxy radicals can extract hydrogen from olefin molecules to yield hydro-peroxides and generate new allylic free radical giving a chain reaction.

It has also been theorised that the initial products of oxidation of unsaturated hydrocarbons are peroxides which eventually end up forming acids, mainly found in the end polymerized products.

Gasoline gum can also originate from oxidation of both reactive hydrocarbons and gasoline impurities (non-hydrocarbons). Paraffins, aromatics, mono-olefins and di-olefins are increasingly unstable towards oxidation. Polymerization and gum formation in gasoline can result from the combined oxidation of reactive hydrocarbons and impurities. Certain metals in small concentrations have also been reported to catalyze the deterioration of gasoline.

SUMMARY OF THE INVENTION

The main objective of the present invention is to provide a process for production of benzene lean gasoline (benzene content less than 0.4 weight %) by recovery of high purity benzene (purity more than 97 weight %) from unprocessed cracked gasoline fraction.

Another objective of the present invention is to provide a reliable process as mentioned above using a benzene concentrated unprocessed catalytically cracked gasoline fraction (boiling in the range of 40° C.-90° C.) containing a mixture of benzene, olefins, di-olefins (including conjugated di-olefins), naphthenes, paraffins, iso-paraffins along with impurities like oxygenates, metals, chlorides, sulphur compounds, nitrogen compounds, and organic peroxides.

Yet another objective of the present invention is to find a suitable solvent/co-solvent combination that can be used in an Extractive Distillation (ED) operation for treating the above mentioned hydrocarbon mixture.

The presence of peroxides along with conjugated di-olefins leads to polymerization reactions due to auto-oxidation. Hence, still another objective of the invention is to establish a suitable solvent/co-solvent combination which remains stable at high temperatures even in the presence of such reactive species.

Accordingly, present invention provides a process for production of benzene lean gasoline (benzene content less than 0.4 weight %) by recovery of high purity benzene (purity more than 97 weight %) from benzene concentrated unprocessed catalytically cracked gasoline fraction containing organic peroxides wherein the feed fraction comprising of benzene in the range of 10-30 weight % and close-boiling non-aromatic hydrocarbons in the range of 70-90 weight % along with impurities like organic peroxides is processed in an extractive distillation (ED) operation using an aromatic selective solvent selected from the group consisting of N-Methyl-2-Pyrrolidone (NMP), N-Formyl-Morpholine (NFM) and Di-Methyl-Formamide (DMF) in combination with a co-solvent and the said process comprising the steps of:

a) adding the pre-heated aromatic selective solvent along with a co-solvent and benzene concentrated unprocessed catalytically cracked gasoline fraction in the solvent mixture to feed weight ratio ranging from 1 to 10, more preferably 2.0 to 6.0, in an Extractive Distillation column wherein the benzene concentrated unprocessed catalytically cracked gasoline fraction enters the ED column at the middle section and solvent along with co-solvent enters the column at the top section;

b) maintaining the ED re-boiler temperature in the range 140° C. to 185° C. followed by recovering benzene lean gasoline (raffinate phase) stream (benzene content less than 0.4 weight %) as the top product and benzene loaded solvent phase (extract phase) as the bottom product;

c) separating the solvent from the extract phase as obtained in step (b) in a Solvent Recovery Column (SRC) to obtain benzene free solvent from the bottom and benzene (with purity more than 97 weight %) from the SRC top.

In some embodiments, the process includes:

a) combining in an extractive distillation (ED) column equipped with a re-boiler (a) a pre-heated feed material consisting of benzene concentrated unprocessed catalytically cracked gasoline fraction containing impurities, 10-30 weight % benzene, and 70-90 weight % close-boiling non-aromatic hydrocarbons; and (b) a pre-heated solvent mixture comprising an aromatic selective solvent selected from the group consisting of N-Methyl-2-Pyrrolidone (NMP), N-Formyl-Morpholine (NFM) and Di-Methyl-Formamide (DMF) and a co-solvent at a solvent mixture to feed material weight ratio of from about 1 to about 10, and wherein the feed material is introduced into the ED column at its middle section and the solvent mixture is introduced into the column at its top section;

b) maintaining the ED re-boiler temperature in the range of about 140° C. to about 185° C.;

c) recovering a raffinate phase containing gasoline having a benzene content of than 0.4 weight % from the top of the ED column and an extract phase containing benzene and solvent mixture from the bottom of the ED column;

d) separating the solvent mixture from the extract phase in a Solvent Recovery Column (SRC) to obtain benzene free solvent from the bottom and benzene having a purity of greater than 97 weight % from the SRC top.

In an embodiment of the present invention, benzene concentrated unprocessed catalytically cracked gasoline fraction is obtained from fluidized catalytic cracking unit of petroleum refinery directly without any pre-treatment.

In one embodiment of the present invention, non-aromatic portion of the hydrocarbons mixture contains at least one olefin, one di-olefin (including conjugated di-olefins), one naphthene, one paraffin and one iso-paraffin.

In another embodiment of the present invention, impurities comprises one or more of metals (not exceeding 1 ppb), oxygenates (1-400 ppm), chlorides (0.1-3 ppm), sulphur (100-700 ppm), nitrogen (0.6-14 ppm) and organic peroxides (peroxide value 20-50 millimoles/liter).

In some embodiments of the present invention, the feed material is preheated to a temperature of about 70° C. to about 90° C. In other embodiments, the solvent mixture is pre-heated to a temperature of about 55° C. to about 70° C. In other embodiments, the feed material is preheated to a temperature of about 70° C. to about 90° C. and the solvent mixture is pre-heated to a temperature of about 55° C. to about 70° C.

In yet another embodiment of the present invention, the impurities of organic peroxides mentioned may either come along with the benzene concentrated unprocessed catalytically cracked gasoline fraction (getting generated in upstream process units or storage vessels) or get generated within the system in-situ under the severe operating conditions of Extractive Distillation (ED).

In yet another embodiment of the present invention, the solvent system (solvent along with co-solvent) separated in SRC is totally reusable/recycled.

In yet another embodiment of the present invention, the co-solvent used is water.

In yet another embodiment of the present invention, the co-solvent used is in combination with the solvent in the range of 0.5 to 6 weight % of total solvent system.

In yet another embodiment of the present invention, solvent system (solvent along with the co-solvent) to feed weight ratio is in the range 1 to 10, and more preferably from 2 to 6.

In yet another embodiment of the present invention, an Extract Section Stripper (ESS) is used to remove the benzene dissolved in the water from the SRC overhead decanter and subsequently use this water from the ESS bottom for washing the raffinate phase.

In yet another embodiment of the present invention, a Raffinate Section Stripper (RSS) is used to remove the non-aromatic hydrocarbons dissolved in the water from the ED overhead decanter and hydrocarbon free water from the RSS bottom is routed to steam generator and introduced as stripping steam in the SRC.

In yet another embodiment of the present invention, the weight ratio of reflux to the final benzene lean gasoline product from the ED is about 0.1:1 to about 2:1.

In yet another embodiment of the present invention, the benzene lean gasoline produced has negligible (peroxide value <3 millimoles/liter) organic peroxides even while processing a feed with high peroxide content (peroxide value more than 30 millimoles/liter) thereby resulting in saving of antioxidant usage in the gasoline pool.

In yet another embodiment of the present invention, recovery of the benzene obtained is more than 98 weight % based on benzene content of benzene concentrated unprocessed catalytically cracked gasoline.

In yet another embodiment of the present invention, purity of the benzene obtained in the final extract product is more than 97 weight %.

In yet another embodiment of the present invention, the solvent along with co-solvent used remains stable and is capable of processing the said hydrocarbon feedstock even in presence of highly reactive impurities within the system and wherein the impurities of concern are mainly organic peroxides.

In yet another embodiment of the present invention, there are negligible degradation/polymerization/corrosion products at any section of the extractive distillation column, solvent recovery column, even in the reboiler, operating with temperatures as high as 185° C. in presence of impurities especially organic peroxides while processing the benzene concentrated unprocessed catalytically cracked gasoline fraction with the said solvent combination.

Figure 1:
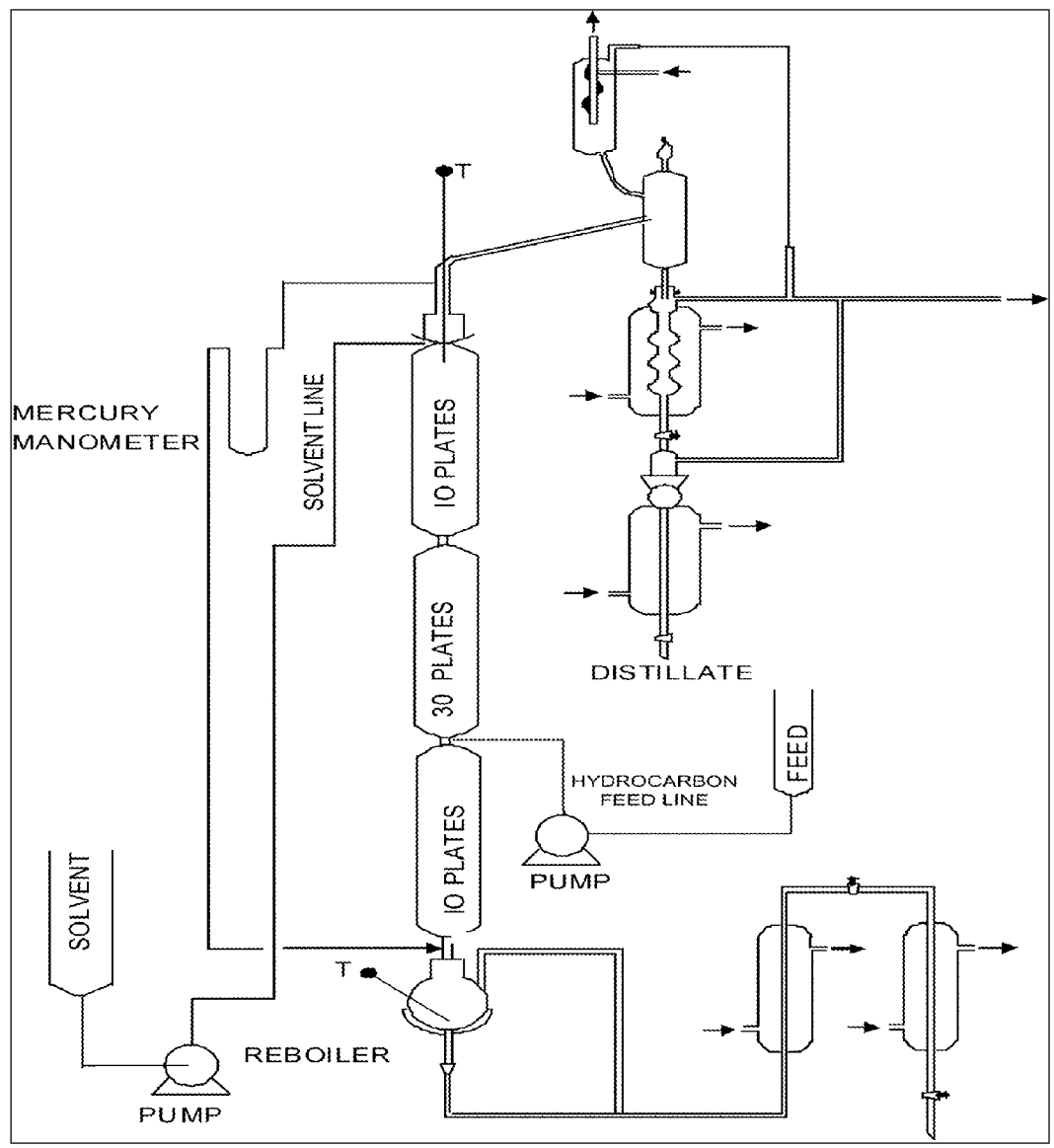
FIG. 1 illustrates the laboratory setup of an Older Shaw column system for conducting the ED column runs. A column of 25 mm internal diameter having 50 sieve plates is fitted with a reflux condenser for cooling the product vapours coming out at the top and a reboiler consisting of electrically heated round bottom flask of 1 liter capacity at the bottom. Benzene concentrated unprocessed catalytically cracked gasoline after pre-heating is added to this column at the 40$^{th}$ plate from the top and the solvent system (solvent along with the co-solvent) after pre-heating is introduced at the top of the column. The flow rates of the solvent system and the hydrocarbon feed to the ED column were adjusted to maintain the desired solvent system to feed weight ratio. The column is operated at reflux ratio in the range of 0.4 to 2.0. After attainment of steady state (typically it takes about 3-6 hours), the operating conditions such as temperature, pressure, flow rates are recorded and a small sample is withdrawn from both the top distillate reservoir and from the reboiler and prepared for component analysis.

The ED column C-01 overhead product enriched in olefins and non-aromatic hydrocarbon(s) and lean in benzene is passed through line 3 and is condensed in air cooler E-04 and trim cooler E-05 to yield a condensed overhead stream 5 which is fed to overhead drum V-01. A portion of the hydrocarbon from V-01 can be returned to ED column C-01 as reflux through line 6, while the benzene lean gasoline product can be routed either to gasoline storage or to other processing units through line 7.

Additionally, a part of water stream from V-01 boot can be used as reflux in C-01 through line 6-A. The weight ratio of said reflux to said overhead product is about 0.1:1 to about 2:1. The V-01 boot water containing traces of dissolved hydrocarbons and solvent is passed to the Raffinate Section Stripper (RSS) C-02 through line 8. The overhead stream 10, comprising hydrocarbons, from C-02 is mixed with C-01 overhead vapour stream 3 and the mixed stream 3-A is sent to Air cooler E-04 and the bottom stream 11 is taken to the steam generator E-14. The circulating solvent system (solvent along with the co-solvent) is added to ED column C-01 through line 2. A portion of circulating solvent system (solvent along with the co-solvent) can also be added to ED column C-01 through line 2-A.

The bottom stream 9 from ED column C-01 is fed to another distillation column C-03 (usually referred as Solvent Recovery Column (SRC)). This SRC overhead stream 12 is condensed in condenser E-10 and trim cooler E-11 and routed to overhead drum V-02 through line 14. A portion of benzene rich extract from overhead drum V-02 can be returned through line 15 as reflux for column C-03 and rest can be routed to storage as extract (product), i.e., benzene of high purity, through line 16 or to any other processing unit.

Additionally, a part of water stream from V-02 boot can also be used as reflux in C-03 through line 15-A and rest of the water can be routed to Extract Section Stripper (ESS) C-04 through line 17. The weight ratio of said reflux to the said overhead product is about 0.6:1 to about 5:1.

The V-02 boot water containing traces of dissolved benzene rich hydrocarbons and solvent is passed to Extract Section Stripper (ESS) C-04 through line 17. The overhead stream 22, comprising mainly benzene rich hydrocarbons, from C-04 is mixed with C-03 overhead vapour stream 12 and the mixed stream 12-A is sent to Air cooler E-10 and the bottom stream 18, which is free of hydrocarbons and solvent, is taken to the ED overhead section where it is mixed with stream 4 issuing from E-04 for the purpose of washing the raffinate hydrocarbons and making them solvent free. The mixed stream 4-A is sent to the trim cooler E-05. The cooled stream 13 from E-10 is subsequently sent to the trim cooler E-11 before being fed to V-02 as stream 14.

Steam, generated using RSS bottom stream in E-14, is injected to the column C-03 via a separate line 19 at the bottom of column C-03. Circulating solvent system (solvent along with c-solvent) stream 20 from solvent recovery column (C-03) bottom is routed to ED side reboiler E-06 and Feed—Lean solvent heat exchanger (E-01) through line 21 and trim cooler E-02. Finally this circulating solvent system (solvent along with c-solvent) after exchanging heat is fed to ED column C-01 through line 2.

E-03, E-08, E-09, E-13 are the reboilers of column C-01, C-02, C-03 and C-04 respectively.

DETAILED DESCRIPTION OF THE INVENTION

The expression "solvent mixture", "solvent along with co-solvent" and "solvent system" have been used interchangeably in the specification.

The present invention provides a reliable process for the production of benzene lean gasoline (benzene content less than 0.4 weight %) by recovery of high purity benzene (purity more than 97 weight %) from benzene concentrated unprocessed catalytically cracked gasoline fraction by Extractive Distillation. The said gasoline fraction is obtained (without any pre-treatment) from a Fluidized Catalytic Cracking (FCC) unit of a petroleum refinery. The said benzene concentrated unprocessed catalytically cracked gasoline fraction, comprises of benzene and close-boiling non-aromatic hydrocarbons like paraffins, iso-paraffins, olefins, di-olefins (including conjugated di-olefins), and naphthenes along with impurities containing but not limited to oxygenates, metals, chlorides, sulphur compounds, nitrogen compounds, and organic peroxides.

The benzene concentrated unprocessed catalytically gasoline fraction used in this invention should preferably have a boiling range of 40° C. to about 90° C.

Preferably, the benzene content in the feed can be about 5 to 40 weight (more preferably about 10-30 weight %), and the corresponding non-aromatic hydrocarbon content is about 60-95 weight % (more preferably about 70-90 weight %).

Non-limiting examples of olefinic hydrocarbons in feed are Cyclopentene, 2-Methyl-1-Pentene, 1-Hexene, 2-Ethyl-1-Butene, Trans-3-Hexene, Trans-2-Hexene, 4-Methylcyclopentene, 3-Methyl-Cis-2-Pentene, 3-Methylcyclopentene, Cis-2-Hexene, 2-Methyl-2-Pentene, 2,3,3-Trimethyl-1-Butene, 4-Methyl-1-Hexene, Trans-3-Heptene and di-olefins such as 2,3-Pentadiene, Cis, Trans-2,4-Hexadiene, their like and their mixtures thereof.

Non-limiting examples of saturated hydrocarbons (Paraffins and Iso-Paraffins) in feed are N-Pentane, 2-Methyl-Butane, N-Hexane, N-Heptane, 2,3-Dimethyl-Butane, 2-Methyl-Pentane, 3-Methyl-Pentane, 2,2,3-Trimethylbutane, 3,3-Dimethylpentane, 2-Methylhexane, 2,3-Dimethylpentane, 3-Methylhexane, 3-Ethylpentane, 2,4-Dimethylpentane, 2,2,4-Trimethylpentane, their like and their mixtures thereof.

Non-limiting examples of saturated cyclic hydrocarbons (Naphthenes) in feed are Cyclopentane, Methylcyclopentane, Cyclohexane, 1,1-Dimethylcyclopentane, Cis-1,3-Dimethylcyclopentane, Trans-1,3-Dimethylcyclopentane, Trans-1,2-Dimethylcyclopentane, Cis-1,2-Dimethylcyclopentane, Methylcyclohexane, Ethylcyclopentane, their like and their mixtures thereof.

Non-limiting examples of said impurities in the feedstock are one or more of metals (in ppb level), oxygenates (1-400 ppm), chlorides (0.1-3 ppm), sulphur (100-700 ppm), nitrogen (0.6-14 ppm) and organic peroxides (peroxide value of 20-50 millimoles/liter).

In the feedstock, impurities of organic peroxides mentioned may either come along with the benzene concentrated unprocessed catalytically cracked gasoline fraction (getting generated in upstream process units or storage vessels) or generated within the system in-situ under the severe operating conditions of Extractive Distillation (ED).

The organic peroxides interact with the di-olefins (especially conjugated di-olefins) initiating polymerization reactions due to auto-oxidation. This reactive mixture can cause the degradation of the solvent system (solvent along with a co-solvent), particularly at the high temperatures encountered in the ED and SRC operations. Thus in the present invention, choosing the right solvent system (solvent along with a co-solvent) which is stable for this particular hydrocarbon feed at the operating conditions suitable to achieve the objective of the invention is the novel and inventive step.

Considering the above challenges involved in the development of an economic and reliable process for production of benzene lean gasoline (benzene content less than 0.4 weight %) by recovery of high purity benzene (purity more than 97 weight %) from benzene concentrated unprocessed catalytically cracked gasoline fraction (boiling in the range 40° C.-90° C.), we obtained such a benzene concentrated unprocessed catalytically cracked gasoline fraction (without any pre-treatment) from a Fluidized Catalytic Cracking (FCC) unit of a petroleum refinery. The composition of the said benzene concentrated unprocessed catalytically cracked gasoline fraction used in the process development is given in Table 1.

TABLE 1

Characteristics of unprocessed catalytically cracked gasoline fraction (Feed)

| | FEED CHARACTERIZATION | ° C. |
|---|---|---|
| 1 | Distillation, ASTM, D86, % Vol. | |
| | Initial boiling point (IBP) | 48.0 |
| | 5% | 67.2 |
| | 10% | 67.5 |
| | 20% | 67.6 |
| | 30% | 68.0 |
| | 40% | 68.3 |
| | 50% | 68.6 |
| | 60% | 69.3 |
| | 70% | 69.9 |
| | 80% | 70.9 |
| | 90% | 72.6 |
| | 95% | 74.6 |
| | Final boiling point (FBP) | 91.8 |
| | Distillate (ml) | 98.0 |
| | Losses (ml) | 0.8 |
| | Residue (ml) | 1.2 |
| 2 | Class type analysis GC, weight % | |
| | Mono Olefins | 35.72 |
| | C6 Di-olefins | 1.18 |
| | Paraffins (Nor + Iso) | 31.54 |
| | Naphthenes | 17.47 |
| | Benzene | 14.09 |
| 3 | Total Sulfur, ppm | 108.1 |
| 4 | Total oxygenates (EN-13132), ppm | 208 |
| 5 | Total Nitrogen, ppm | 6.65 |
| 6 | Total Chlorides, ppm | 0.1 |
| 7 | Metals, ppb | 40 |
| 8 | Peroxide Value, milimoles/litre | 36.75 |
| 9 | Density $kg/m^a$, @ 20° C. | 725 |
| 10 | Research Octane Number (RON) | 87.0 |

As seen in Table 1, the said benzene concentrated unprocessed catalytically cracked gasoline fraction contains olefins along with other hydrocarbon and impurities boiling in a narrow range of 40° C. to 90° C. In view of this feed composition and narrow boiling range, it was decided to use extractive distillation for recovery of benzene from this feed stock by using commonly used polar solvents like Sulfolane, NMP, DMF, and NFM.

To start with, Sulfolane was used, as it is the most widely used solvent for aromatic recovery from reformate or hydrogenated PG using either solvent extraction or extractive distillation. The laboratory setup for conducting the extractive distillation (ED) column run is given in FIG. 1. The benzene concentrated unprocessed catalytically cracked gasoline as given in Table 1 was used. A solvent system to feed weight ratio of 3.0 was maintained in the ED column, where the solvent system used was a mixture of Sulfolane and water (99.2:0.8 wt. %).

At reboiler temperature of around 120° C., it was observed that the mixture in the reboiler started darkening, and at around 125° C. it became black. There was no flow of hydrocarbon to the top and hence no overhead sample could be withdrawn. Pressure drop across the column ($\Delta P$) rose from 25 mm to 40 mm Hg. At this stage, the experiment had to be aborted. After dismantling the unit, thick black polymerized material was observed on the sieve plates of the column and on the internal surface of the reboiler still. The system was thoroughly washed and the above run was repeated again. The same phenomena as mentioned above, was observed again.

The polymerized product in the above experiment was withdrawn and analysed. It was found to be the degradation product of Sulfolane. It is well documented in literature that Sulfolane exhibits decomposition at temperature above 180° C. [Sulfolane Technical assistance and evaluation report, Final Jun. 1, 2010, Alaska Department of Environmental Conservation]. The above observation is possibly due to the reaction of the organic peroxides and di-olefins (especially conjugated types) present in the system with sulfolane which led to formation of polymerization products even at temperature as low as 125° C.

Following from the above observation, it became pertinent to find a stable solvent system (solvent along with the co-solvent) for processing hydrocarbon feedstocks containing substantial amount of di-olefins and organic peroxides. The commercially used polar solvents i.e. Sulfolane, NMP, DMF, and NFM systems were thus rigorously tested for their thermal and oxidative stability in the presence of the benzene concentrated unprocessed catalytically cracked gasoline of Table 1.

Figure 2:
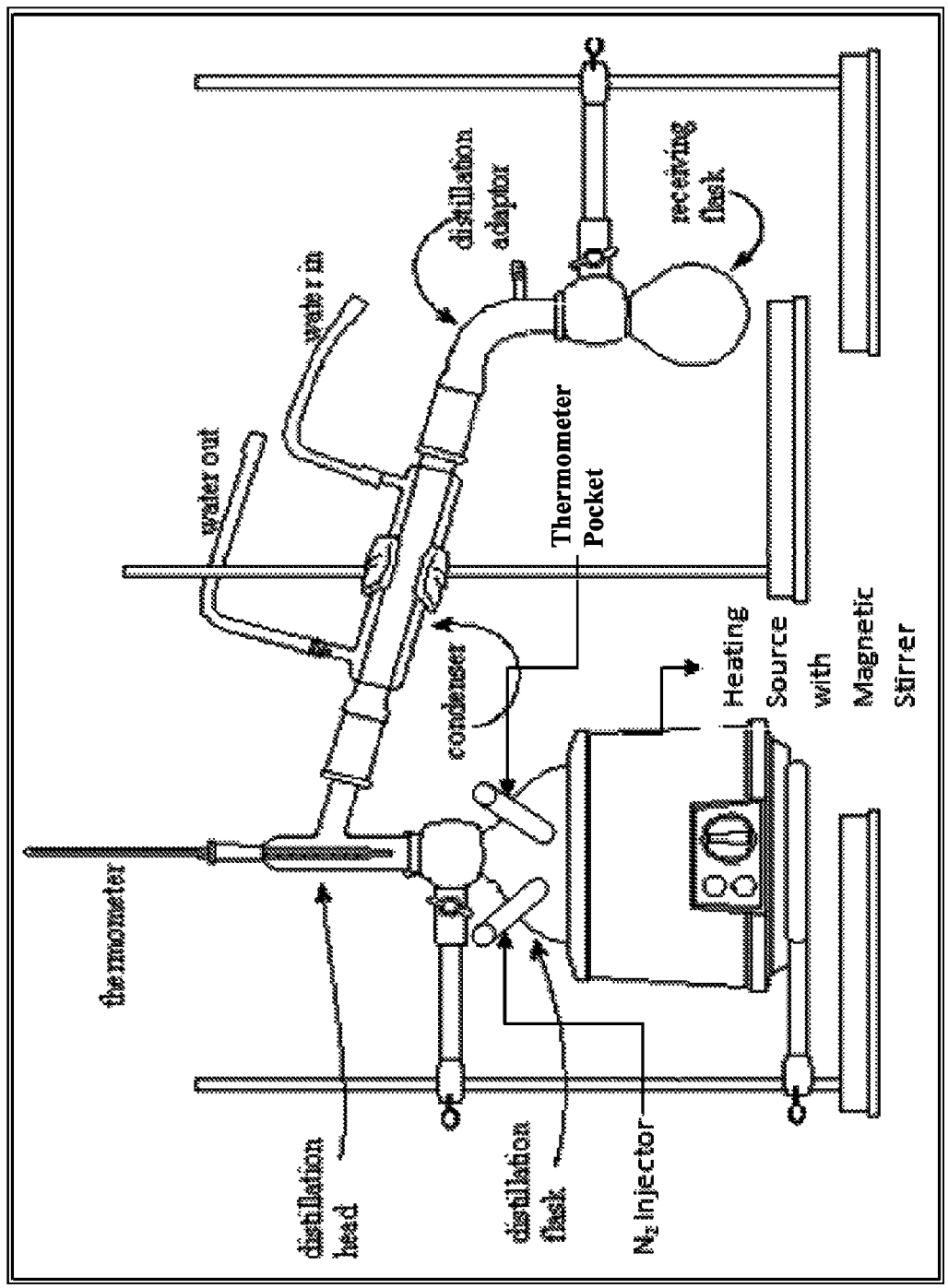
FIG. 2 illustrates a three neck round bottom flask setup for studying the Thermal and Oxidative Stability of solvent systems (solvent along with a co-solvent). The setup comprises of a three neck round bottom flask heated over a thermostatic hot plate capable of providing heat up to 300° C. Feed mixture consisting of various proportions of solvent systems (solvent along with a co-solvent) and hydrocarbon feed, is taken inside the flask and heated for three hours along with constant stirring up to a maximum temperature of 190° C.
Figure 3:
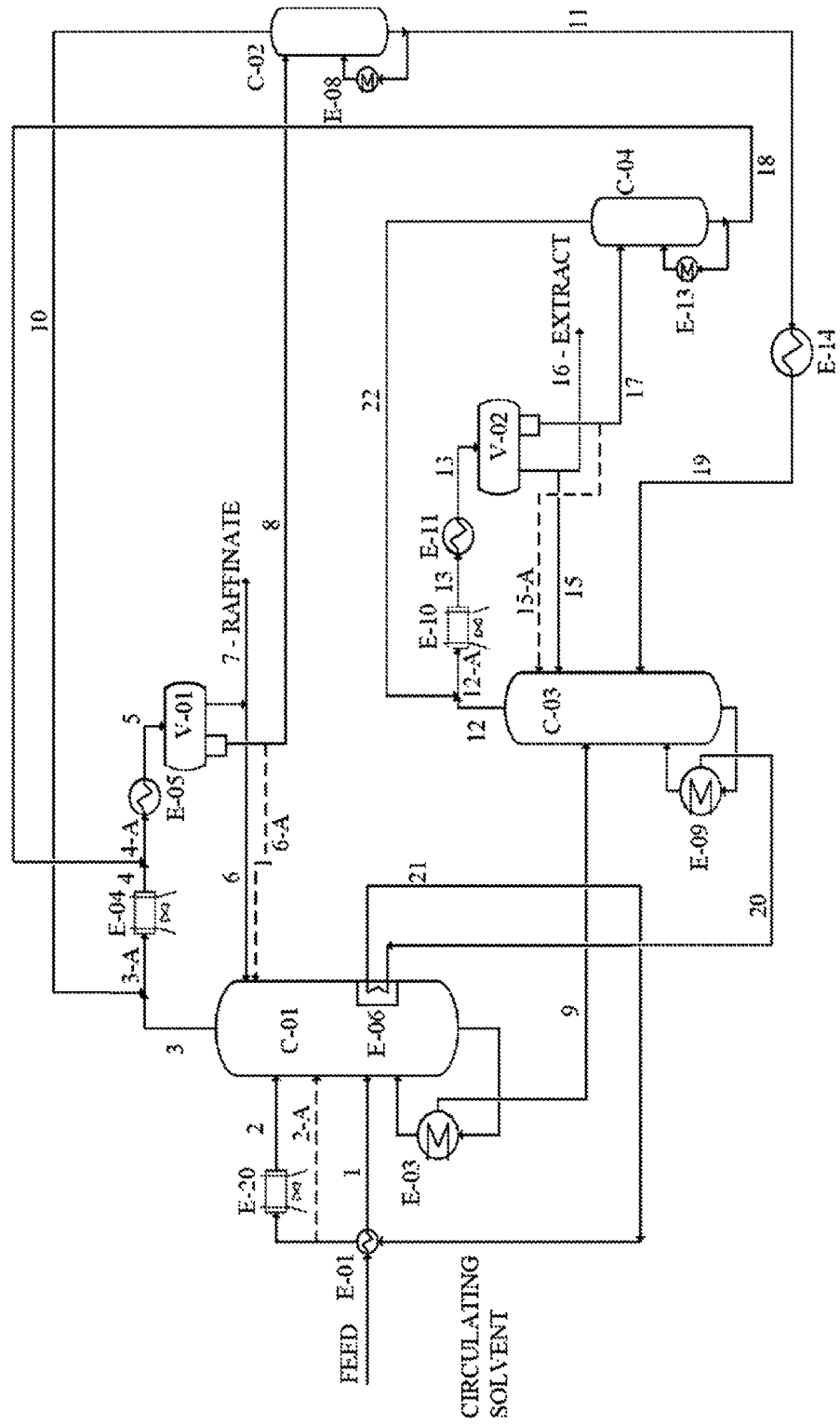
FIG. 3 graphically illustrates the extractive distillation process according to the present invention. The feed, benzene concentrated benzene concentrated unprocessed catalytically cracked gasoline fraction (boiling in the range 40° C.-90° C.) containing a mixture of benzene, olefins, di-olefins (including conjugated di-olefins), non-aromatic hydrocarbons like naphthenes, paraffins, iso-paraffins along with impurities like oxygenates, metals, chlorides, sulphur compounds, nitrogen compounds and organic peroxides is introduced through line 1 to the middle portion of a multi-stage ED column C-01 through Feed pre-heater E-01 which is using the circulating solvent system (solvent along with the co-solvent) as the hot stream 21.

The above stability studies were carried out using the experimental set up as given in FIG. 2. Sulfolane, sulfolane (92 wt. %) and 3-methyl sulfolane (8 wt. %), NMP (98 wt. %) and water (2 wt. %.), NFM (97 wt. %) and water (3 wt. %), DMF (97 wt. %) and water (3 wt. %) were individually mixed with benzene concentrated unprocessed catalytically cracked gasoline in the ratio of 3:1 by weight and heated.

No dark colouration of feed mixtures or deposit formation was observed with aqueous NMP, aqueous NFM and aqueous DMF; however, with Sulfolane and mixture of Sulfolane-3-methyl Sulfolane a black colouration with deposit formation was observed at temperatures as low as 126° C. The observations are summarized in Table 2.

Hydrocarbon feedstocks from actual commercial systems may have high concentration of peroxides and moreover peroxides may also get generated within the ED system at the high temperatures. Thus the shortlisted solvent systems (aqueous NMP, aqueous NFM and aqueous DMF) mentioned above needed to be tested for their stability in peroxide rich (feedstocks with peroxide value higher than 150 millimoles/liter) environment as well. Thermal stability studies of the above solvent systems (solvent along with the co-solvent) were carried out with a synthetically prepared feed having a high peroxide value (benzene concentrated unprocessed catalytically cracked gasoline+ extra organic peroxides added separately) as detailed later (See Example 4). Results indicated that these solvent systems remain thermally stable and do not degrade even with feed mixtures having a peroxide value as high as 158 millimoles/liter at temperatures normally encountered in ED systems.

Thus based on the observations of the thermal and oxidative stability runs, we established that certain solvents systems do remain stable and can be used in ED operation to process such a peroxide laden hydrocarbon stream.

Following from the above, in the ED process of the invention, an aromatic selective solvent is selected from the group consisting of N-Methyl-2-Pyrrolidone (NMP), N-Formyl-Morpholine (NFM), and Di-Methyl-Formamide (DMF) in combination with a co-solvent, such as water.

In this process pre-heated aromatic selective solvent system (solvent along with the co-solvent) and benzene concentrated unprocessed catalytically cracked gasoline fraction in the weight ratio ranging from 1 to 10, more preferably 2.0 to 6.0, are treated in an Extractive Distillation column wherein the benzene concentrated unprocessed catalytically cracked gasoline fraction enters the ED column at the middle section and solvent system (solvent along with the co-solvent) enters the column at the top section below the reflux entry point. ED re-boiler temperature is maintained in the range 140° C. to 185° C.

Benzene lean gasoline (raffinate) is recovered from the top of ED while bottom product is the benzene loaded solvent phase (extract).

Separation of the solvent system from the extract phase is accomplished in a Solvent Recovery Column (SRC) to obtain hydrocarbon free solvent system from the bottom and benzene (with purity more than 97 weight %) from the SRC top.

The co-solvent used is water in the range of 0.5 to 6 weight % of total solvent mixture.

The solvent system to feed weight ratio maintained in the ED column is in the range 1 to 10, preferably from 2 to 6.

In the process an Extract Section Stripper (ESS) is provided to remove the benzene dissolved in the water from the SRC overhead decanter and subsequently the stripped water is used for washing the raffinate phase.

In the process, a Raffinate Section Stripper (RSS) is provided to remove the non-aromatic hydrocarbons dissolved in the water from the ED overhead decanter. Hydrocarbon free water from the RSS bottom is routed to steam generator for introducing as stripping steam in the SRC.

In the process, the weight ratio of reflux to the final benzene lean gasoline product from the ED is about 0.1:1 to about 2:1.

Also in the process, the benzene lean gasoline produced has negligible (peroxide value <3 millimoles/liter) organic peroxides even while processing a feed with high peroxide content (peroxide value more than 30 millimoles/liter). This in turn would reduce the consumption of anti-oxidant additives which are traditionally added to gasoline.

In the process, recovery of the benzene is more than 98 weight % (based on benzene content of benzene concentrated unprocessed catalytically cracked gasoline) along with purity of more than 97 weight %.

In the said invention, the solvent system (solvent along with the co-solvent) used remains stable and is capable of processing the said hydrocarbon feedstock even in presence of highly reactive impurities within the system and wherein the impurities of concern are mainly organic peroxides.

Further in the present invention, there is negligible degradation/polymerization/corrosion product at any section of the extractive distillation column or the solvent recovery column, even in their reboilers, operating at temperatures as high as 185° C. in presence of impurities especially organic peroxides while processing the benzene concentrated unprocessed catalytically cracked gasoline fraction and the solvent/co-solvent combination thereby assuring reliable operation.

EXAMPLES

The following examples are given by way of illustration and therefore should not be construed to limit the scope of the invention.

The feedstock used in these examples is benzene concentrated unprocessed catalytically cracked gasoline fraction (boiling in the range 40° C.-90° C.) as described in Table 1.

Example 1

ED Run of Feed with Sulfolane and Water (99.2:0.8) Wt. %

Feed: Benzene concentrated unprocessed catalytically cracked gasoline fraction, as per detail composition provided in Table 1

Solvent System: Mixture of Sulfolane and water (99.2:0.8) wt. % Experimental set up as per FIG. 1

Solvent system-to-feed weight ratio of 3.0

Reflux ratio 0.6 v/v (Reflux ratio=Reflux Rate/Product Rate)

At reboiler temperature of around 120° C., it was observed that the mixture in the reboiler started darkening, and at around 125° C. it became black. There was no flow of hydrocarbon to the top and hence no overhead sample could be withdrawn. Pressure drop across the column (ΔP) rose from 25 mm to 40 mm Hg. At this stage, the experiment had to be aborted. After dismantling the unit, thick black polymerized material was observed on the sieve plates of the column and on the internal surface of the reboiler still.

Example 2

ED Run of Feed with Sulfolane and Water (99.2:0.8) Wt. %-Repeated

Based on the observations in Example 1, it was decided to repeat the ED run using the same Feed and Solvent System (Sulfolane and water (99.2:0.8 wt. %)). The complete apparatus described in FIG. 1 was thoroughly washed to remove the polymerized material and the above run was repeated again. The same polymerization phenomena as mentioned above in Example-1, was observed again.

The polymerized products in the above experiments were withdrawn and analysed. These were found to be degradation products of sulfolane. It is well documented in literature that Sulfolane exhibits decomposition at temperatures above 180° C. [*Sulfolane Technical assistance and evaluation report, Final* Jun. 1, 2010, *Alaska Department of Environmental Conservation*]. The above observation is possibly due to the reaction of the organic peroxides and di-olefins (especially conjugated types) present in the feed with sulfolane which has led to formation of polymerization products even at temperature as low as 125° C.

Example 3

Batch Thermal Stability Runs

Following from the above observation, it became pertinent to find a stable solvent system (solvent along with a co-solvent) for processing hydrocarbon feedstocks containing substantial amount of di-olefins and organic peroxides. The commercially used polar solvents i.e. Sulfolane, NMP, DMF, and NFM systems were thus rigorously tested for their thermal and oxidative stability in the presence of the benzene concentrated unprocessed catalytically cracked gasoline of Table 1.

The stability studies were carried out using the experimental set up as given in FIG. 2. Sulfolane, sulfolane (92 wt. %) and 3-methyl sulfolane (8 wt. %), NMP (98 wt. %) and water (2 wt. %), NFM (97 wt. %) and water (3 wt. %), DMF (97 wt. %) and water (3 wt. %) were individually mixed with benzene concentrated unprocessed catalytically cracked gasoline fraction in the ratio of 3:1 by weight and heated.

No dark colouration of feed mixtures or deposit formation was observed with aqueous NMP, aqueous NFM and aqueous DMF; however, with Sulfolane and mixture of Sulfolane and 3-methyl Sulfolane a black colouration with deposit formation was observed at temperatures as low as 126° C. These observations are summarized in Table 2.

TABLE 2

Thermal stability studies with benzene concentrated unprocessed catalytically cracked feedstock (Feed) and solvent systems under nitrogen atmosphere

| Solvent System | Mixture of Solvent systems with Feed | | | | |
|---|---|---|---|---|---|
| | Sulfolane | Sulfolane/3-Me-sulfolane (92:8 wt. %) | NMP/Water (98:2 wt. %) | NFM/Water (97:3 wt. %) | DMF/Water (97:3 wt. %) |
| | Observation for colour and deposits of feed-solvent system mixture | | | | |
| Observations | Black after 126° C. | Black after 128° C. | Not black (180° C.) | Not black (180° C.) | Not black (150° C.) |

Note:
The observations of Example-3 highlight the fact that Sulfolane or sulfolane based systems become unstable in the presence of peroxides and di-olefins at elevated temperatures.

However, aqueous NFM, aqueous NMP and aqueous DMF based solvent systems work with said benzene concentrated unprocessed catalytically cracked gasoline fraction containing substantial amount of peroxide and Di-olefins and do not degrade.

In order to establish the stability of aqueous NMP, even in the presence of very high peroxide content in benzene concentrated unprocessed catalytically cracked gasoline, an experiment was conducted as detailed in the Example 4 below.

Example-4

Solvent System Stability in Peroxide Rich Environment

Feed: Benzene concentrated unprocessed catalytically cracked gasoline fraction, as per detail composition given in Table 1
Solvent System: Mixture of Solvent and water (97.9:2.1 wt. %)
Experimental set up as per FIG. 2
Solvents tested: NMP, NFM, DMF
Solvent system-to-feed weight ratio of 3.0.

Extra organic peroxide (tertiary butyl hydro-peroxide, TBHP) was added to the Feed. The analysis of prepared feed indicated peroxide value of around 158 millimoles/liter. The experiment was carried out using a laboratory setup as illustrated in FIG. 2. The solvent systems aqueous NMP, aqueous NFM and aqueous DMF were heated individually with the feed mixture (benzene concentrated unprocessed catalytically cracked gasoline fraction and additional TBHP) continuously for three hours up to 190° C., 190° C. and 150° C. respectively. None of the mixtures produced any deposits in the system.

Further, most of the peroxides remained in the solvent phase since the peroxide value of distilled hydrocarbons was found to be 2.58, 2.65, and 2.75 millimoles/liter for the respective solvent systems.

Example 5

ED Run of Feed with NMP and Water (99.2:0.8) wt. %

Feed: Benzene concentrated unprocessed catalytically cracked gasoline fraction, as per detail composition given in Table 1
Solvent System: Mixture of NMP and water (99.2:0.8 wt. %)
Experimental set up as per FIG. 1
Solvent system-to-feed weight ratio of 3.58
Reflux ratio 0.6 v/v.
Column Top Pressure—0.93 atm, Column Bottom Pressure—0.96 atm Column Reboiler Temp.—180° C.

The apparatus used is illustrated in FIG. 1 and has been detailed in the previous section. The said benzene concentrated unprocessed catalytically cracked gasoline fraction after preheating is added to the distillation column at the $40^{th}$ plate from the top and the solvent system as defined above after preheating is introduced at the top of the column. The flow rates of the solvent system and the hydrocarbon feed were adjusted to maintain the desired Solvent system-to-feed weight ratio of 3.58. The column is operated at a reflux ratio 0.6 volume by volume. After attainment of steady state which took approximately 3 hours, a reboiler temperature of 180° C. was achieved. Right throughout the run normal operation was observed with acceptable limits of pressure drop across the column. Neither any deposits were observed in the system nor was any significant discoloration of the system.

A small sample of top distillate and bottom reboiler extract was withdrawn from the ED column. The ED bottom reboiler extract was then distilled separately in a solvent recovery column (SRC) to recover benzene rich hydrocarbon portion (made solvent free) at the top.

The composition of the hydrocarbon portion of the top and bottom product of the ED column is provided in Table-3.

Results indicate that benzene purity achieved in the final benzene rich aromatic product is 98.07 weight % whereas benzene content of benzene lean gasoline is 0.05 weight %. Benzene recovery in the Extract (with respect to feed) is 99.69%.

TABLE 3

Composition of Solvent Free Raffinate and Solvent Free Extract in ED run of Feed with NMP and Water (99.2:0.8) wt %

| Components | Raffinate (Solvent Free) Mass % | Extract (Solvent Free) Mass % |
|---|---|---|
| Mono Olefins | 42.01 | 0.51 |
| C6 Di-Olefins | 0.85 | 1.17 |
| Paraffins (Normal + ISO) | 36.42 | 0.25 |
| Naphthenes | 20.67 | 0.00 |
| Benzene | 0.05 | 98.07 |
| Total | 100.00 | 100.00 |
| Benzene Recovery (%) | — | 99.69 |

The above purity of benzene in extract can perhaps be achieved at lower temperatures as well, by optimizing the selectivity and capacity of the solvent system. In view of this, several experiments were carried out; a few are illustrated below.

Example 6

ED Run of Feed with NMP and Water (97.8:2.2) wt %

Feed: Benzene concentrated unprocessed catalytically cracked gasoline fraction, as per detail composition given in Table 1
Solvent System: Mixture of NMP and water (97.8:2.2) wt. % Experimental set up as per FIG. 1
Solvent system-to-feed weight ratio of 3.55
Reflux ratio 0.6 v/v.
Column Top Pressure—0.93 atm, Column Bottom Pressure—0.96 atm Column Reboiler Temp.—160° C.

The apparatus used is illustrated in FIG. 1 and has been detailed in the previous section. The said benzene concentrated unprocessed catalytically cracked gasoline fraction after preheating is added to the distillation column at the $40^{th}$ plate from the top and the solvent system as defined above after preheating is introduced at the top of the column. The flow rates of the solvent system and the hydrocarbon feed were adjusted to maintain the desired Solvent system-to-feed weight ratio of 3.55. The column is operated at a reflux ratio 0.6 volume by volume. After attainment of steady state which took approximately 3 hours, a reboiler temperature of 160° C. was achieved. Right throughout the run normal operation was observed with acceptable limits of pressure drop across the column. Neither any deposits were observed in the system nor was any significant discoloration of the system.

A small sample of top distillate and bottom reboiler extract was withdrawn from the ED column. The ED bottom reboiler extract was then distilled separately in a solvent recovery column (SRC) to recover benzene rich hydrocarbon portion (made solvent free) at the top.

The composition of the hydrocarbon portion of the top and bottom product of the ED column is provided in Table 4.

Results indicate that benzene purity achieved in the final benzene rich aromatic product is 97.92 weight % whereas benzene content of benzene lean gasoline is 0.02 weight %. Benzene recovery in the extract (with respect to feed) is 99.87%.

TABLE 4

Composition of Solvent Free Raffinate and Solvent Free Extract in ED run of Feed with NMP and Water (97.8:2.2) wt %

| Components | Raffinate (Solvent Free) Mass % | Extract (Solvent Free) Mass % |
|---|---|---|
| Mono Olefins | 41.20 | 0.40 |
| C6 Di-Olefins | 0.42 | 1.43 |
| Paraffins (Normal + Iso) | 38.07 | 0.24 |
| Naphthenes | 20.29 | 0.01 |
| Benzene | 0.02 | 97.92 |
| Total | 100.00 | 100.00 |
| Benzene Recovery (%) | — | 99.87 |
| Total Sulfur, ppm | 3.1 | 628.6 |

The above results indicate that increased water content in the solvent system reduces the reboiler temperature but still gives high purity of benzene product.

Example 7

ED Run of Feed with NMP and Water (94.9:5.1) Wt %

Feed: Benzene concentrated unprocessed catalytically cracked gasoline fraction, as per detail composition given in Table 1
Solvent System: Mixture of NMP and water (94.9:5.1) wt. % Experimental set up as per FIG. 1
Solvent system-to-feed weight ratio of 3.01
Reflux ratio 0.6 v/v.
Column Top Pressure—0.93 atm, Column Bottom Pressure—0.96 atm
Column Reboiler Temp.—145° C.

The apparatus used is illustrated in FIG. 1 and has been detailed in the previous section. The said benzene concentrated unprocessed catalytically cracked gasoline fraction after preheating is added to the distillation column at the $40^{th}$ plate from the top and the solvent system as defined above after preheating is introduced at the top of the column. The flow rates of the solvent system and the hydrocarbon feed were adjusted to maintain the desired Solvent system-to-feed weight ratio of 3.01. The column is operated at a reflux ratio 0.6 volume by volume. After attainment of steady state which took approximately 3 hours, a reboiler temperature of 145° C. was achieved. Right throughout the run normal operation was observed with acceptable limits of pressure drop across the column. Neither any deposits were observed in the system nor was any significant discoloration of the system.

A small sample of top distillate and bottom reboiler extract was withdrawn from the ED column. The ED bottom reboiler extract was then distilled separately in a solvent recovery column (SRC) to recover benzene rich hydrocarbon portion (made solvent free) at the top.

The composition of the hydrocarbon portion of the top and bottom product of the ED column is provided in Table 5.

Results indicate that benzene purity achieved in the final benzene rich aromatic product is 97.33 weight % whereas benzene content of benzene lean gasoline is 0.16 weight %. Benzene recovery in the Extract (with respect to feed) is 99.03%.

TABLE 5

Composition of Solvent Free Raffinate and Solvent Free Extract in ED run of Feed with NMP and Water (94.9:5.1) wt %

| Components | Raffinate (Solvent Free) Mass % | Extract (Solvent Free) Mass % |
|---|---|---|
| Mono Olefins | 41.90 | 0.24 |
| C6 Di-Olefins | 1.01 | 2.20 |
| Paraffins (Normal + Iso) | 37.18 | 0.22 |
| Naphthenes | 19.75 | 0.01 |
| Benzene | 0.16 | 97.33 |
| Total | 100.00 | 100.00 |
| Benzene Recovery (%) | — | 99.03 |

As seen from the above Examples 5, 6 and 7, high purity of benzene can be achieved even at lower reboiler temperatures by optimizing the water content in the solvent system, and tuning the solvent system to feed weight ratio. Lower reboiler temperatures reduce operating costs by use of low cost utility and/or result in lower capital cost due to higher ΔT between the heating media and the reboiler temperature.

We have thus achieved less than 0.4 weight % benzene in the benzene lean gasoline product while attaining benzene purity greater than 97 weight % in the benzene rich product.

Existing processes in the hydrocarbon industry remove benzene by saturating it through hydrogenation which results in lowering of octane number due to saturation of olefins and loss of valuable Benzene. Several other alternative methods have also been developed to reduce benzene in cracked gasoline; like the ones mentioned below.

The process mentioned in the U.S. Pat. No. 7,501,549 includes etherification, separation, hydro treatment and solvent extraction to recover benzene and iso-olefins ethers.

The process mentioned in the U.S. Pat. No. 8,143,466 includes alkylation using alcohol and ether for partial alkylation of Benzene. Water washing of hydrocarbon stream is required to recover the un-reacted alcohol and ether which further require energy intensive alcohol and ether recovery steps for reuse.

The known processes are complex, involving number of steps and external chemical agents (alcohol, ether, hydrogen, proprietary catalysts, etc.) with poor or zero recovery of benzene and are energy intensive.

The process mentioned in our patent application includes two separation steps only (Extractive Distillation followed by Solvent Recovery) without the need of a prior hydrogenation step to saturate di-olefins/olefins which makes it very simple, energy efficient, and economical.

Additional advantage of our process is that it is simple to operate without the need of expensive equipment such fired heaters, steam jet ejectors, or compressors. This equipment not only increases the capital investment but also need intensive maintenance as well as increased operating expenditures. Since our process neither use hydrogen nor any energy intensive steps, it is environmental friendly with minimum greenhouse gas footprint.

Environmental friendly solvent and mild operating conditions allow the use of traditional material of construction (MOC) such as carbon steel.

The recovery of benzene is significantly high i.e. more than 98 weight % from the benzene concentrated unprocessed catalytically cracked gasoline fraction feedstock and the recovered benzene purity is also high (more than 97 weight %). The process also simultaneously provides a gasoline fraction with less than 0.4 weight % benzene with retention of Octane value.

The process also ensures substantial reduction in peroxide content in the treated gasoline fraction as compared to the main feedstock, which implies lower consumption of anti-oxidant additives in gasoline pool.

The solvent/co-solvent combination can be tailored for handling any concentration of benzene in benzene concentrated unprocessed catalytically cracked gasoline.

The solvent/co-solvent combination can also be tailored to remain thermally and oxidatively stable all throughout the operation, in all the involved units, at all the sections, at all the temperatures prevalent (even in the ED or SRC reboiler).

In the process, there are negligible degradation/polymerization/corrosion products at any section of the extractive distillation column or the solvent recovery column, even in the respective reboilers, which may operate with temperatures as high as 185° C. in presence of highly reactive impurities like organic peroxides while processing the benzene concentrated unprocessed catalytically cracked gasoline fraction. The aromatic selective solvent along with co-solvent (solvent system) remain stable in the presence of the highly reactive species such as conjugated di-olefins and organic peroxides during the extractive distillation of the complex impurity laden feed.

We claim:

1. A process for production of gasoline having a benzene content of less than about 0.4 weight % comprising:
    a) combining in an extractive distillation (ED) column equipped with a re-boiler
        (a) a pre-heated feed material consisting of benzene concentrated unprocessed catalytically cracked gasoline fraction obtained from a fluidized catalytic cracking unit of a petroleum refinery without any pre-treatment, wherein the gasoline fraction contains impurities, 10-30 weight % benzene, and 70-90 weight % close-boiling non-aromatic hydrocarbons, and the impurities comprise one or more of metals at a level not exceeding 1 ppb, 1-400 ppm oxygenates, 0.1-3 ppm chlorides, 100-700 ppm sulphur, 0.6-14 ppm nitrogen, and organic peroxides at a peroxide level of 20-50 millimoles/liter; and
        (b) a pre-heated solvent mixture comprising an aromatic selective solvent selected from the group consisting of N-Methyl-2-Pyrrolidone (NMP), N-Formyl-Morpholine (NFM) and Di-Methyl-Formamide (DMF) and a co-solvent
        at a solvent mixture to feed material weight ratio of from about 1 to about 10, and wherein the feed material is introduced into the ED column at its middle section and the solvent mixture is introduced into the column at its top section;
    b) maintaining the ED re-boiler temperature in the range of about 140° C. to about 185° C.;
    c) recovering a raffinate phase containing gasoline having a benzene content of less than 0.4 weight % from the top of the ED column and an extract phase containing benzene and solvent mixture from the bottom of the ED column; and
    d) separating the solvent mixture from the extract phase in a Solvent Recovery Column (SRC) to obtain benzene free solvent from the bottom and benzene having a purity of greater than 97 weight % from the SRC top.

2. The process according to claim 1, wherein the said non-aromatic hydrocarbons contains at least one olefin, one di-olefin, one naphthene, one paraffin and one iso-paraffin.

3. The process according to claim 1, wherein the feed material is preheated to a temperature of about 70° C. to about 90° C., and the solvent mixture is pre-heated to a temperature of about 55° C. to about 70° C.

4. The process according to claim 1, further comprising recycling the solvent system separated using the SRC in d).

5. The process according to claim 1, wherein the co-solvent is water.

6. The process according to claim 1, wherein the co-solvent is present at an amount of from about 0.5 to about 6 weight % of the solvent mixture.

7. The process according to claim 1, wherein the ratio of solvent mixture to feed material is from about 2 to about 6.

8. The process according to claim 5, further comprising removing benzene dissolved in the water co-solvent from the SRC with an Extract Section Stripper (ESS) to produce substantially benzene-free water, and subsequently using the substantially benzene-free water to wash the raffinate phase.

9. The process according to claim 1, further comprising removing the non-aromatic hydrocarbons dissolved in the water from the ED overhead decanter with a Raffinate Section Stripper (RSS); and routing hydrocarbon free water from the RSS bottom to a steam generator and introduced steam produced by the generator as stripping steam in the SRC.

10. The process according to claim 1, wherein the weight ratio of reflux to the raffinate phase from the ED is about 0.1:1 to about 2:1.

11. The process according to claim 1, wherein the feed material contains peroxides at a level of least about 30 millimoles/liter and the raffinate is substantially free of peroxides.

12. The process according to claim 1, wherein greater than 98 weight % of the benzene is recovered based on benzene content of the benzene concentrated unprocessed catalytically cracked gasoline.

* * * * *

UNITED STATES PATENT AND TRADEMARK OFFICE
CERTIFICATE OF CORRECTION

| | | |
|---|---|---|
| PATENT NO. | : 8,722,952 B2 | Page 1 of 1 |
| APPLICATION NO. | : 13/963772 | |
| DATED | : May 13, 2014 | |
| INVENTOR(S) | : Madhukar Onkarnath Garg et al. | |

It is certified that error appears in the above-identified patent and that said Letters Patent is hereby corrected as shown below:

On the Title page:

Item (30), the foreign priority application is missing.
Please add -- (IN) 2502/DEL/2012 August 9, 2012 --

Signed and Sealed this
Ninth Day of December, 2014

Michelle K. Lee
*Deputy Director of the United States Patent and Trademark Office*